United States Patent
Rovinsky et al.

(10) Patent No.: US 12,535,301 B2
(45) Date of Patent: Jan. 27, 2026

(54) ACTIVE PROTECTION AGAINST BEAM-RIDING GUIDED MUNITION

(71) Applicant: ELTA SYSTEMS LTD., Ashdod (IL)

(72) Inventors: Jacob Rovinsky, Modiin (IL); Yoav Tourgeman, Moshav Moledet (IL)

(73) Assignee: ELTA SYSTEMS LTD., Ashdod (IL)

( * ) Notice: Subject to any disclaimer, the term of this patent is extended or adjusted under 35 U.S.C. 154(b) by 319 days.

(21) Appl. No.: 18/550,041

(22) PCT Filed: Mar. 2, 2022

(86) PCT No.: PCT/IL2022/050228
§ 371 (c)(1),
(2) Date: Sep. 11, 2023

(87) PCT Pub. No.: WO2022/190083
PCT Pub. Date: Sep. 15, 2022

(65) Prior Publication Data
US 2024/0247916 A1     Jul. 25, 2024

(30) Foreign Application Priority Data

Mar. 11, 2021   (IL) .......................................... 281535

(51) Int. Cl.
  *F41H 11/02* (2006.01)
  *F41G 7/00* (2006.01)
  *F41G 7/22* (2006.01)

(52) U.S. Cl.
  CPC .............. *F41H 11/02* (2013.01); *F41G 7/007* (2013.01); *F41G 7/224* (2013.01); *F41G 7/2253* (2013.01)

(58) Field of Classification Search
  CPC ....................................................... G01S 3/789
  See application file for complete search history.

(56) References Cited

U.S. PATENT DOCUMENTS

| | | | |
|---|---|---|---|
| 5,662,291 A | 9/1997 | Sepp et al. | |
| 5,664,741 A * | 9/1997 | Duke ........................ | F41G 7/26 244/3.11 |
| 6,568,627 B1 * | 5/2003 | Jones ........................ | F41G 7/26 244/3.13 |
| 6,717,543 B2 | 4/2004 | Pappert et al. | |
| 8,464,949 B2 | 6/2013 | Namey et al. | |
| 9,335,127 B1 | 5/2016 | Boka et al. | |
| 11,181,346 B1 * | 11/2021 | Barfoot .................. | F41G 7/224 |

(Continued)

FOREIGN PATENT DOCUMENTS

| | | |
|---|---|---|
| DE | 2922592 A1 | 4/1981 |
| EP | 2051039 A1 | 4/2009 |

*Primary Examiner* — Bernarr E Gregory
(74) *Attorney, Agent, or Firm* — Fisher Broyles, LLP; Roger L. Browdy

(57) ABSTRACT

The presently disclosed subject matter includes an active protection system and a method, dedicated for detecting, locating, and incapacitating beam-riding missiles and in that way protecting an asset from being targeted by the missile. According to some examples following receipt of a threat-indication, the active protection system estimates a location of a beam used for directing a threat (e.g., ATGM) to the target and launches an aerial platform that flies in the opposite direction along the beam until it meets and incapacitates the incoming threat.

32 Claims, 7 Drawing Sheets

(56) References Cited

U.S. PATENT DOCUMENTS

| | | | |
|---|---|---|---|
| 2008/0001064 A1* | 1/2008 | Thomas | G01S 3/789 |
| | | | 250/206.1 |
| 2014/0061364 A1 | 3/2014 | Strassman | |
| 2014/0368814 A1* | 12/2014 | Krupkin | F41G 7/224 |
| | | | 356/139.08 |
| 2018/0335779 A1 | 11/2018 | Fisher et al. | |
| 2019/0250255 A1 | 8/2019 | Frucht | |
| 2020/0108925 A1 | 4/2020 | Smith et al. | |
| 2020/0180784 A1 | 6/2020 | Frucht | |

* cited by examiner

ACTIVE PROTECTION AGAINST BEAM-RIDING GUIDED MUNITION

FIELD OF THE PRESENTLY DISCLOSED SUBJECT MATTER

The presently disclosed subject matter relates in general to the field of interception of and protection against beam-riding guided munition.

BACKGROUND

Beam-riding, also known as Line-Of-Sight Beam Riding (LOSBR), is a missile guiding technique where a missile is directed towards a target using a beam of electromagnetic radiation that is pointed towards the target. Beam-riding is used for example in anti-armor munitions (e.g., anti-tank guided missiles (ATGMs)).

A beam-riding firing unit includes in general a missile launcher (e.g., ATGM launcher) and an aiming station (e.g., AGTM aiming station). During operation, the launcher is used for launching the missile, and the aiming station is used for generating a narrow beam (e.g., by laser source; referred to herein also as "guiding beam" or "designating beam"), which is pointed towards a target for guiding the missile (e.g., ATGM) in the target's direction. The missile is configured such that following launch it strives to retain itself within the beam ("ride" the beam), while the aiming station is used for maintaining the beam in the vicinity of the target, thus leading the missile to the target.

GENERAL DESCRIPTION

The presently disclosed subject matter includes an active protection system and a method, dedicated for detecting, locating and incapacitating beam-riding missiles, and in that way protecting an asset from being targeted by the missile. Following receipt of a threat-indication, the active protection system estimates a location of a beam used for directing a threat (e.g., ATGM) to the target and launches an aerial platform (otherwise referred to herein as "countermeasure" or "effector") that flies in the opposite direction along the beam until it meets and incapacitates the incoming threat. The term "threat-indication" is used herein to include any type of indication of an incoming threat such as a missile or drone, including, for example, data indicative of a launch event, as well as data indicative of detection of an incoming threat while airborne.

As the active protection system disclosed herein utilizes the guiding beam used for guiding an incoming threat for back tracking along the beam and intercepting the threat, the point of interception is distanced from the targeted asset. Therefore, this approach also helps to reduce the risk of harming the targeted asset or nearby assets (e.g., nearby vehicles or humans) as a result of the interception.

In addition to intercepting an incoming threat, the active protection system disclosed herein provides information indicative of the location of the firing unit (e.g., AGTM firing unit) and therefore enables to issue a counterattack on the enemy forces responsible for launching the threat.

According to one aspect of the presently disclosed subject matter there is provided a system for intercepting a beam-riding threat (e.g., missile or unmanned aerial vehicle, including a drone), the system comprising:
 a tracking subsystem, a computer processing circuitry and a countermeasure subsystem;

the tracking subsystem is configured, following receipt of a threat-indication, to track an incoming threat and provide threat track-data to the computer processing circuitry;
the processing circuitry is configured to determine, based on the threat track-data, an estimated location of a guiding beam used for guiding the incoming threat;
the protection system is configured to:
generate instructions causing the countermeasure subsystem to launch at least one aerial platform (e.g., missile or drone) towards the guiding beam, the aerial platform comprising an onboard sensor sensitive for detecting electromagnetic radiation of the guiding beam; and
provide to the aerial platform the estimated location of the guiding beam, to thereby enable the aerial platform to locate the guiding beam and operate the onboard sensor for flying along the guiding beam towards the incoming threat.

In addition to the above features, the system according to this aspect of the presently disclosed subject matter can optionally comprise one or more of features (i) to (xxx) below, in any desired combination or permutation:

i. wherein the onboard sensor is an onboard camera operatively connected to an onboard processing circuitry, the aerial platform comprises a flight control subsystem;
    the onboard processing circuitry is configured to:
    process images captured by the onboard camera, and identify in the images a spot created by a beam source of the guiding beam;
    monitor the location of the spot relative to the camera (e.g., relative to the focal plane array of the camera) and provide data to the flight control subsystem for causing the flight control subsystem to maneuver the aerial platform such that the spot is maintained within the focal plane array of the camera and thereby align a flight path of the aerial platform with the direction of the beam.
 ii. wherein the onboard camera is a wide-angle camera assembled to the platform at a fixed position.
 iii. wherein the onboard camera is attached to the aerial platform via gimbals.
 iv. wherein the onboard camera is assembled to the platform in a fixed position and further comprises a mirror mechanism attached to the platform via gimbals.
 v. wherein the spot is a main spot produced by direct illumination of the beam source, and the onboard processing circuitry is further configured to:
    process the images and identify, in addition to the main spot, secondary spots created by scattering of a beam from a body of the threat;
    monitor the location of the secondary spots relative to the main spot; and provide to the flight control subsystem data, enabling the flight control subsystem to maneuver the aerial platform such that the images show the main spot at the center surrounded by the secondary spots, thereby maintaining the flight path of the aerial platform aligned with the beam.
 vi. wherein the onboard processing circuitry is further configured to:
    process the images and identify an airframe-shadow (e.g., missile-shadow) resulting from a body of the incoming threat blocking the guiding beam; provide data to the flight control subsystem for enabling the flight control subsystem to maneuver the aerial platform such that the images show the airframe-shadow, thereby maintaining the flight path of the aerial platform aligned with the flight path of the incoming threat.

vii. wherein the aerial platform is configured to enter the beam and fly inside the beam.

viii. wherein the tracking subsystem comprises a radar configured to track the incoming threat and collect threat track-data.

ix. wherein the tracking subsystem comprises a radar configured to track the aerial platform and collect platform track-data.

x. wherein the tracking subsystem further comprises a camera configured to track flying objects together with the radar and thereby improve accuracy of the threat track-data obtained by the radar.

xi. wherein the camera is configured to capture images at a frame rate that exceeds the rate of radar plot measurements to thereby obtain accurate lateral velocity of the tracked object which is orthogonal to radial velocity determined by the radar alone.

xii. wherein the radar is configured to operate in scanning mode for scanning a suspected area in search of an incoming threat, and switch to tracking mode for tracking the incoming threat and collecting threat track-data, following detection of a threat-indication by the radar.

xiii. wherein the tracking system is configured, following launch of the aerial platform, to continue and track the incoming threat and collect threat track-data;
the processing circuitry is configured to determine, based on the threat track-data, the updated beam location which is transmitted to the aerial platform using the data-link communication;

xiv. wherein the tracking system further comprises or is otherwise operatively connected to a launch detection sensor, wherein a launch detection sensor is configured to detect a threat launch event and determine an estimated location of a launch site, wherein the threat-indication is provided by the launch detection sensor following detection of the threat launch event.

xv. wherein the tracking system is configured, following launch of the aerial platform, to continue and track the incoming threat and collect threat track-data;
the processing circuitry is configured to determine and transmit to the aerial platform updated location of the launch site, determined based on the threat track-data and position of the launch site provided by the launch detection sensor.

xvi. wherein the processing circuitry is configured to determine and transmit to the aerial platform, locations of a beam and a launch site, relative to current position of the aerial platform; wherein determination of relative position is based on fusion of threat track-data and aerial track-data.

xvii. wherein the aerial platform is configured to transmit to the processing circuitry, during flight along the beam (e.g., within the beam volume), data indicative of one or more lines of sight (LOS data) from the aerial platform to the beam source; wherein the processing circuitry is configured to estimate location of a firing unit, based on the LOS data.

xviii. The system further comprises or is otherwise operatively connected to a launch detection sensor configured to detect a threat launch event and determine an estimated location of a launch site, wherein the threat-indication is provided by the sensor following detection of the threat launch event; wherein the aerial platform is configured to transmit, to the processing circuitry, during flight along the beam, LOS data indicative of one or more lines of sight extending from the aerial platform to the beam source, identifiable by the main spot;
wherein the processing circuitry is configured to improve an accuracy of a firing unit localization based on the LOS data received from the aerial platform and the estimated location of the launch site received from the launch detection sensor.

xix. wherein the aerial platform comprises a countermeasure configured to be activated for incapacitating the threat upon compliance with a countermeasure activation condition.

xx. wherein the countermeasure activation condition is in direct contact with the threat.

xxi. wherein the countermeasure activation condition is a countermeasure activation range.

xxii. wherein the countermeasure is operatively connected to a proximity fuse configured to process images captured by the onboard camera and determine the range and/or closing velocity of the threat based on changes detected in the images.

xxiii. wherein the changes in the images include any one of: changes in size of a main spot, and changes in size of an airframe-shadow.

xxiv. wherein the countermeasure subsystem is configured to launch at least two aerial platforms.

xxv. wherein in case of a divided firing unit, comprising an aiming station and a launcher, where the launcher is located at a launch site and the aiming station is located at a location other than the launch site, the countermeasure subsystem is configured to launch at least one aerial platform targeting the launch site and/or at least one aerial platform targeting the aiming station.

xxvi. wherein the at least two aerial platforms include a leading aerial platform and at least one trailing aerial platform, and wherein, in case the leading aerial platform fails to incapacitate the incoming threat, the at least one trailing platform is directed towards the beam to target the incoming threat.

xxvii. The system is configured for assessing successful incapacitation of the incoming threat by the leading aerial platform based on data obtained by any one of: the radar and/or the camera, and the at least one trailing aerial platform.

xxviii. wherein the onboard sensor is an onboard receiver configured to detect a radio frequency guiding beam and wherein, in some examples, the onboard processing circuitry is configured to:
process signals captured by the onboard receiver and provide data to the flight control subsystem for causing the flight control subsystem to maneuver the aerial platform such that a flight path of the aerial platform is aligned with the direction of the beam.

xxix. wherein, in some examples, the onboard processing circuitry is configured to process signals captured by the onboard receiver, and identify a main lobe of the guiding beam;
monitor the location of the main lobe relative to the receiver field of view (FOV), and provide data to the flight control subsystem for causing the flight control subsystem to maneuver the aerial platform such that the main lobe is maintained within the FOV of the receiver, and thereby align a flight path of the aerial platform with the direction of the beam.

xxx. wherein the system is operable for protecting an asset from being hit by the incoming threat.

According to another aspect of the presently disclosed subject matter there is provided a method of intercepting a beam riding threat (e.g., missile or drone), the method comprising:

following receipt of a threat-indication, tracking an incoming threat and determining threat track-data;
determining, based on the threat track-data, an estimated location of a guiding beam used for guiding the threat;
launching at least one aerial platform towards the guiding beam; and providing to the aerial platform the estimated location of the guiding beam, to thereby enable the aerial platform to locate the guiding beam and fly along the guiding beam towards the approaching threat.

According to another aspect of the presently disclosed subject matter there is provided a computer readable storage medium (e.g., a non-transitory computer readable storage medium) tangibly embodying a program of instructions that, when executed by a computer, cause the computer to perform a method of intercepting a beam-riding threat, the method comprising:

following receipt of a threat-indication, tracking an incoming threat and determining threat track-data;
determining, based on the threat track-data, an estimated location of a guiding beam used for guiding the threat; launching at least one aerial platform towards the guiding beam; and providing to the aerial platform the estimated location of the guiding beam, to thereby enable the aerial platform to locate the guiding beam and fly along the guiding beam towards the approaching threat.

The method and computer storage device disclosed herein according to various aspects, can optionally further comprise one or more of features (i) to (xxx) listed above, mutatis mutandis, in any technically possible combination or permutation.

According to another aspect of the presently disclosed subject matter there is provided a system for locating a firing unit of an incoming beam guided threat, the system comprising:

a tracking subsystem and a computer processing circuitry;
the tracking subsystem is configured, following receipt of a threat-indication, to track an incoming threat and determine threat track-data;
the processing circuitry is configured to determine, based on the threat track-data, an estimated location of a guiding beam;
the system is configured to:
generate instructions causing launch of at least one aerial platform, provide to the aerial platform the estimated location of the guiding beam, to thereby enable the aerial platform to locate the guiding beam and fly along the guiding beam (e.g., inside the guiding beam volume) towards the incoming missile;
wherein the aerial platform comprises an onboard camera operatively connected to an onboard processing circuitry, the onboard camera is sensitive for detecting electromagnetic radiation of the guiding beam;
the onboard processing circuitry is configured to:
process images captured by the onboard camera, and identify, in the images, data indicative of a beam source of the guiding beam (e.g., beam spot or air-frame shadow);
wherein the aerial platform is configured to transmit to the processing circuitry, during flight along the beam, line of sight data indicative of one or more lines of sight (LOS) from the aerial platform to the beam source; and the processing circuitry is configured to determine a location of the beam source, being part of the firing unit, based on the LOS data.

In some examples, the system of the previous aspect further comprises, or is otherwise operatively connected to, a launch detection sensor configured to detect a missile launch event and determine an estimated location of a launch site, and wherein the threat-indication is provided by the launch detection sensor; the proccing circuitry is configured to determine an augmented location, having improved accuracy, of a missile launch site, based on the one or more lines of sight and the estimated location of the launch site received from the sensor.

In some examples, the system of the previous aspect further comprises a countermeasure subsystem configured to launch at least one aerial platform towards the firing unit according to the augmented location.

In some examples, in case of a divided firing unit, comprising an aiming station and a launcher at a launch site located at a location different than the aiming station, the countermeasure subsystem is configured to launch at least one aerial platform targeting the launch site and/or at least one aerial platform targeting the aiming station.

In some examples, in the system according to the previous aspect, the processing unit is configured to monitor the location of the spot relative to a focal plane array (FPA) of the camera; and cause the aerial vehicle to maneuver, such that the spot is maintained within the FPA of the camera and thereby align a flight path of the aerial platform with the direction of the guiding beam.

According to another aspect of the presently disclosed subject matter there is provided a system for locating a firing unit of an incoming missile, the system comprising:

a tracking subsystem operatively connected to a computer processing circuitry;
the tracking subsystem is configured, following receipt of a threat-indication, to scan a respective area, track an incoming threat (e.g., missile), and determine respective threat track-data;
the system further comprises, or is otherwise operatively connected to, a launch detection sensor configured to detect a threat launch by the firing unit and determine an estimated location of a missile launch site;
the processing circuitry is configured to determine, based on the threat track-data, an estimated location of a virtual guiding beam being indicative of a line pointing from the threat towards the launch site; and determine a location of the missile launch site based on the virtual guiding beam and the estimated location of the threat launch site received from the launch detection sensor.

In some examples the system of the previous aspect comprises a countermeasure subsystem configured to launch at least one aerial platform towards the launch site according to the verified location.

According to another aspect of the presently disclosed subject matter there is provided a method of locating an aiming station of a firing unit of an incoming beam guided missile, the method comprising:

following receipt of a threat-indication: utilizing a tracking device or subsystem for tracking an incoming missile and determining threat track-data;
determining, based on the threat track-data, an estimated location of a guiding beam;
generating instructions causing launch of at least one aerial platform towards the guiding beam, and providing to the aerial platform the estimated location of the guiding beam, to thereby enable the aerial platform to locate the guiding beam and fly along the guiding beam (e.g., inside the guiding beam volume) towards the incoming missile;

operating a camera onboard the aerial platform for capturing images while flying along the guiding beam;

processing the images and identifying in the images a spot created by a beam source of the guiding beam;

determining LOS data indicative of one or more lines of sight extending from the aerial platform to the beam source;

and determining an estimated location of an aiming station of a firing unit, based on the LOS data.

In some examples the method of the previous aspect further comprises:

directing the aerial platform towards the launch site according to the estimated location; and/or launching at least one additional aerial platform and directing it towards the launch site according to the estimated location.

In some examples the method of the previous aspect further comprises:

determining the location of a firing unit based on the LOS data and estimated location of a launch site received from the missile launch sensor.

According to another aspect of the presently disclosed subject matter there is provided a method of locating a firing unit of an incoming missile, the method comprising:

following receipt of a threat-indication: utilizing a tracking device or subsystem for scanning a respective area, tracking an incoming missile, and determining threat track-data;

receiving an estimated location of the incoming missile launch site (e.g., from a launch sensor);

determining, based on the threat track-data, an estimated location of a virtual guiding beam being indicative of a line pointing towards the launch site; determining an augmented location of the missile launch site based on the direction of the virtual beam and the estimated location of the launch site received from the sensor.

According to another aspect of the presently disclosed subject matter there is provided an aerial platform (e.g., a missile, drone, etc.) configured to incapacitate a beam riding threat (e.g., missile or drone, etc.); the platform comprises a flight control subsystem and an onboard sensor operatively connected to an onboard processing circuitry;

the aerial platform is configured to:

receive data indicative of estimated location of a guiding beam used for guiding the incoming threat, be launched and fly towards the guiding beam, locate the guiding beam and fly along the guiding beam (e.g., enter and fly within the volume of the beam) towards the incoming threat;

wherein the onboard sensor is sensitive for detecting electromagnetic radiation of the guiding beam;

the onboard processing circuitry is configured to:

process data sensed by the sensor and generate instructions causing the aerial platform to fly along the guiding beam.

In addition to the above features, the aerial platform can optionally comprise one or more of features (i) to (x) below, in any desired combination or permutation:

i. Where the onboard sensor is a camera and the data includes images captured by the camera; the processing circuitry is configured to:

process the images captured by the onboard camera, and identify in the images a spot created by a beam source of the guiding beam;

monitor the location of the spot relative to a focal plane array of the camera; and provide data to the flight control subsystem for causing the flight control subsystem to maneuver the aerial platform such that the spot is maintained within the camera's focal plane array and thereby align a flight path of the aerial platform with the direction of the beam.

ii. Wherein the spot is a main spot produced by direct illumination of the beam source, and the onboard processing circuitry is further configured to:

process the images and identify, in addition to the main spot, secondary spots created by scattering of the beam from a body of the threat (e.g., missile body);

monitor the location of the secondary spots relative to the main spot; and provide to the flight control subsystem data, enabling the flight control subsystem to maneuver the aerial platform such that the images show the main spot at the center surrounded by the secondary spots, thereby maintaining the flight path of the aerial platform aligned with the beam.

iii. Wherein the onboard processing circuitry is further configured to:

process the images and identify an airframe-shadow (e.g., missile-shadow) resulting from a body of the threat (e.g., missile) blocking the guiding beam; provide data to the flight control subsystem for enabling the flight control subsystem to maneuver the aerial platform such that the images show the main spot covered by the airframe-shadow, thereby maintaining the flight path of the aerial platform aligned with the flight path of the incoming threat.

iv. wherein the aerial platform is configured to enter the beam and fly inside the beam.

v. wherein the aerial platform comprises a countermeasure configured to be activated for incapacitating the threat upon compliance with a countermeasure activation condition.

vi. wherein the countermeasure activation condition is in direct contact with the threat.

vii. wherein the aerial platform comprises a countermeasure configured to be activated for incapacitating the threat upon compliance with countermeasure activation range.

viii. wherein the countermeasure is operatively connected to a proximity fuse configured to process images captured by the onboard camera and determine a range and/or closing velocity of the threat based on changes in the size of the main spot detected in the images.

ix. wherein the aerial platform comprises a countermeasure configured to be activated for incapacitating the incoming threat upon compliance with countermeasure activation range; wherein the countermeasure is operatively connected to a proximity fuse configured to process images captured by the onboard camera and determine a range and/or closing velocity of the threat based on changes in the size of an airframe-shadow detected in the images.

x. The system wherein the onboard sensor is an onboard receiver configured to detect a radio frequency guiding beam and wherein the onboard processing circuitry is configured to:

process signals captured by the onboard receiver, and identify a main lobe of the guiding beam;

monitor the location of the main lobe relative to the radar field of view (FOV), and provide data to the flight control subsystem for causing the flight control subsystem to maneuver the aerial platform such that the main lobe is maintained within the FOV of the radar and thereby align a flight path of the aerial platform with the direction of the beam.

According to another aspect of the presently disclosed subject matter there is provided a non-transitory computer readable storage medium tangibly embodying a program of instructions that, when executed by a computer onboard an aerial platform, execute a method of incapacitating an incoming beam riding threat (e.g., missile), the method comprising:

receiving data indicative of estimated location of a guiding beam used for guiding an incoming threat;

controlling the aerial platform to fly towards the guiding beam, locate the guiding beam, and fly along the guiding beam towards the incoming threat;

processing data sensed by a sensor onboard the aerial platform and generate instructions causing the aerial platform to fly along the guiding beam towards the incoming threat, to enable incapacitation of the threat.

The presently disclosed subject matter further contemplates one or more non-transitory computer readable storage mediums tangibly embodying a program of instructions that, when executed by a computer, cause the computer to perform any one of the methods disclosed herein above according to various aspects of the presently disclosed subject matter.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
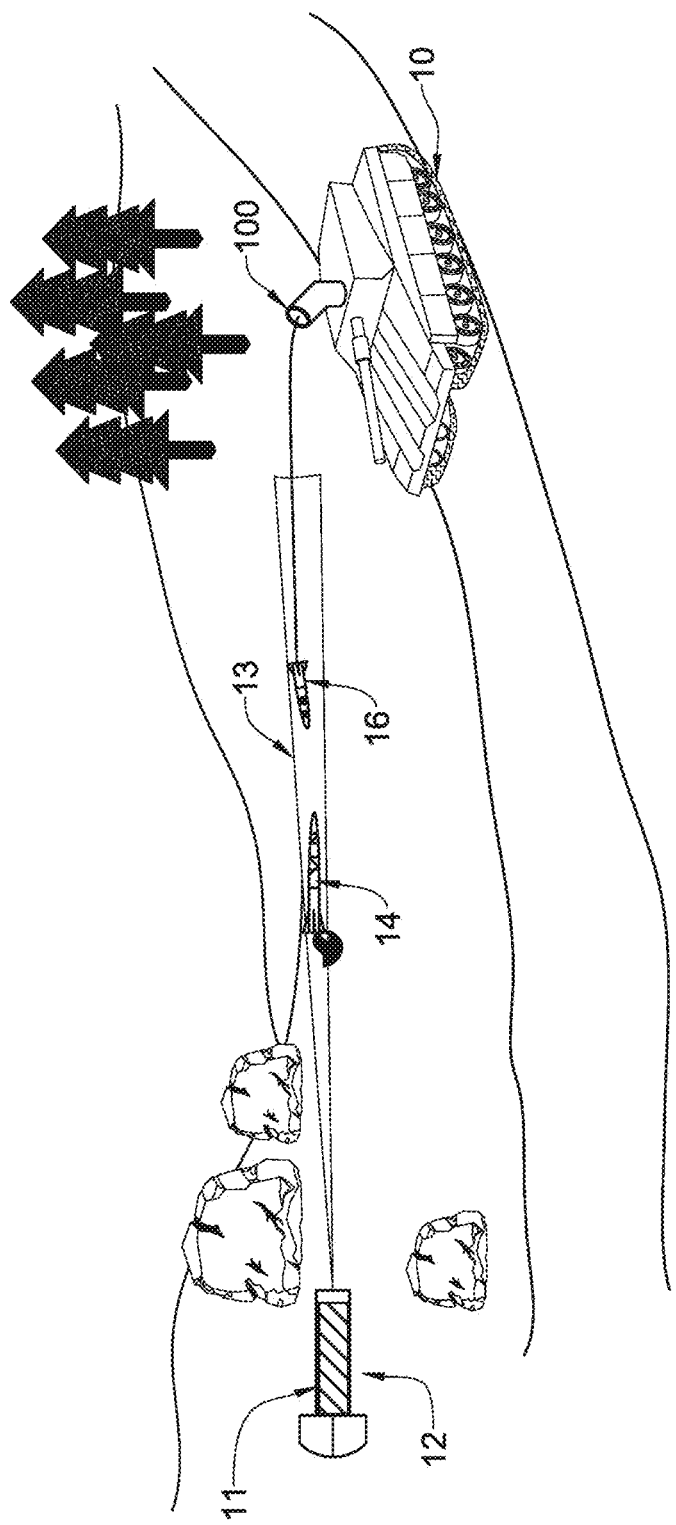
FIG. 1 is a schematic illustration of a possible active protection scenario, according to examples of the presently disclosed subject matter.

Unless specifically stated otherwise, as apparent from the following discussions, it is appreciated that throughout the specification discussions utilizing terms such as "providing", "determining", "generating", "processing" and "monitoring" or the like, include action and/or processes of a computer that manipulate and/or transform data into other data, said data represented as physical quantities, e.g. such as electronic quantities, and/or said data representing physical objects.

The terms "system", "sub-system", "unit" or variations thereof should be expansively construed to include any kind of hardware electronic device with a processing circuitry, which includes (at least one) computer processing device configured and operable to execute computer instructions stored, for example, on a computer memory being operatively connected thereto. Examples of a processing circuitry include, but are not limited to: a digital signal processor (DSP), a microcontroller, a microprocessor, a field programmable gate array (FPGA), an application specific integrated circuit (ASIC), or any other electronic computing device, and/or any combination thereof.

As used herein, phrases such as "for example," "such as", "for instance" and variants thereof may be used to describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

For the sake of clarity, the term "substantially" may be used herein to imply the possibility of variations in values within an acceptable range. According to one example, the term "substantially" should be interpreted to imply possible variation of up to 10% over or under any specified value. According to another example, the term "substantially" should be interpreted to imply possible variation of up to 5% over or under any specified value. According to yet another example, the term "substantially" should be interpreted to imply possible variation of up to 2.5% over or under any specified value. According to a further example, the term "substantially" should be interpreted to imply possible variation of up to 1% over or under any specified value. In other examples, other variations can be applied. For example, "substantially straight line" implies the possibility of some deviations from a perfect straight line, nonetheless, a line that, given the available equipment, can be assumed to be straight. In another example, "substantially at the center" implies the possibility of some deviation from the exact center.

Figure 3:
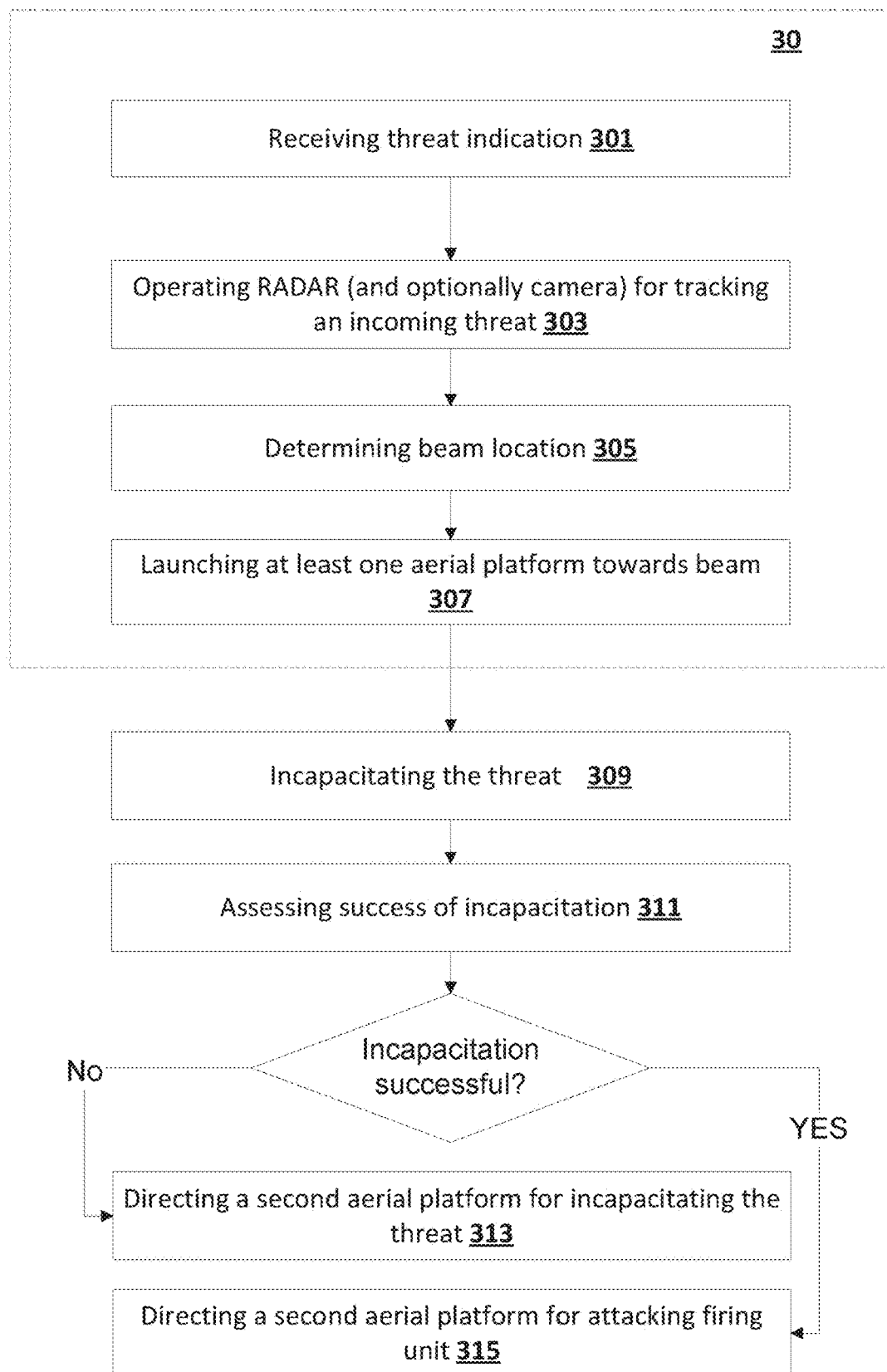
FIG. 3 is a flowchart of operations carried out during active protection, according to some examples of the presently disclosed subject matter.
Figure 5:
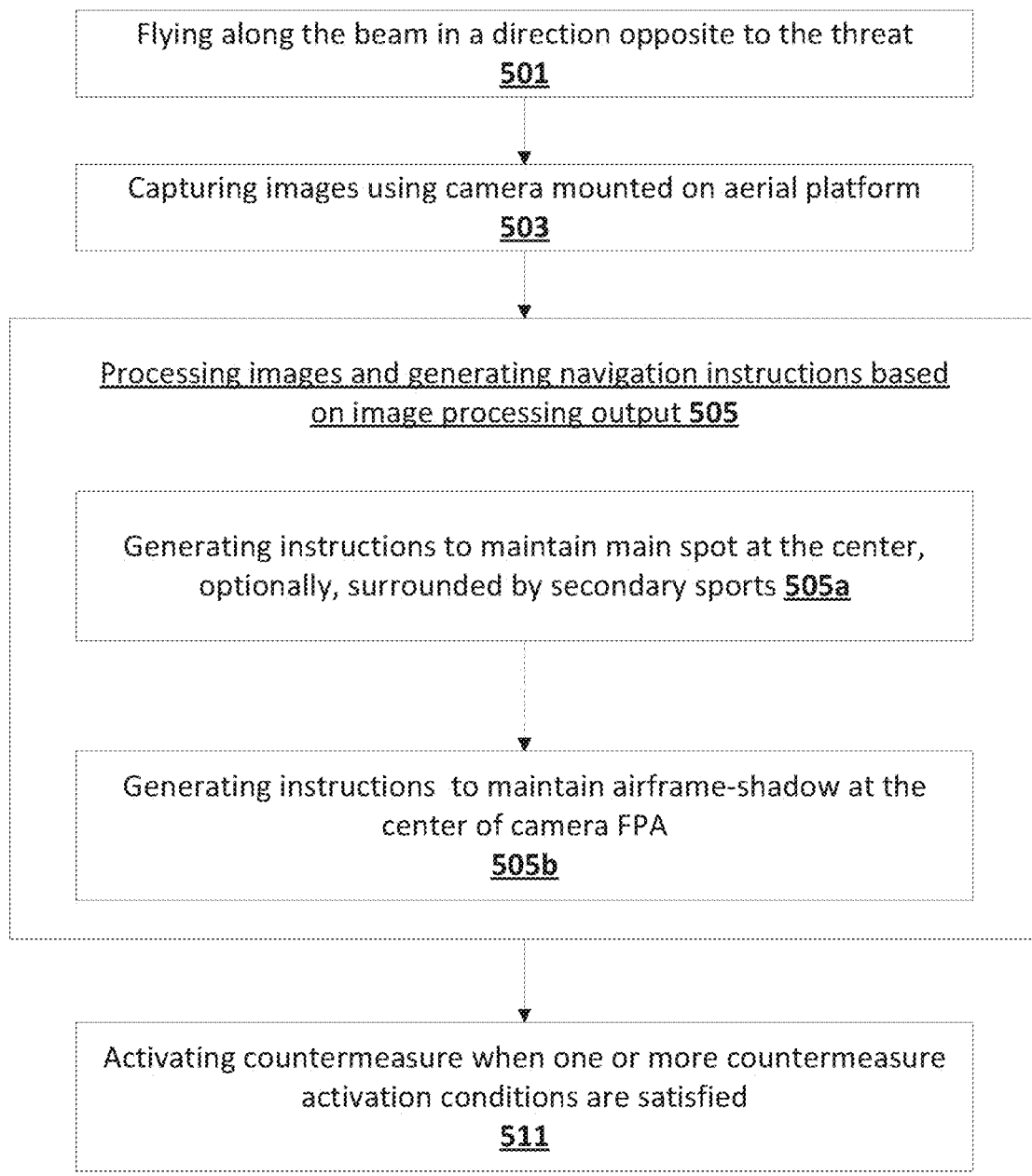
FIG. 5 is a flowchart of operations carried out by an intercepting platform, according to some examples of the presently disclosed subject matter.

In embodiments of the presently disclosed subject matter, fewer, more and/or different stages than those shown in FIGS. 3 and 5 may be executed. In embodiments of the presently disclosed subject matter, one or more stages illustrated in FIGS. 3 and 5 to 7 may be executed in a different order and/or one or more groups may be executed simultaneously. For example, the operations described with reference to blocks 301a and 301b in FIG. 6 may be executed simultaneously.

Figure 2:
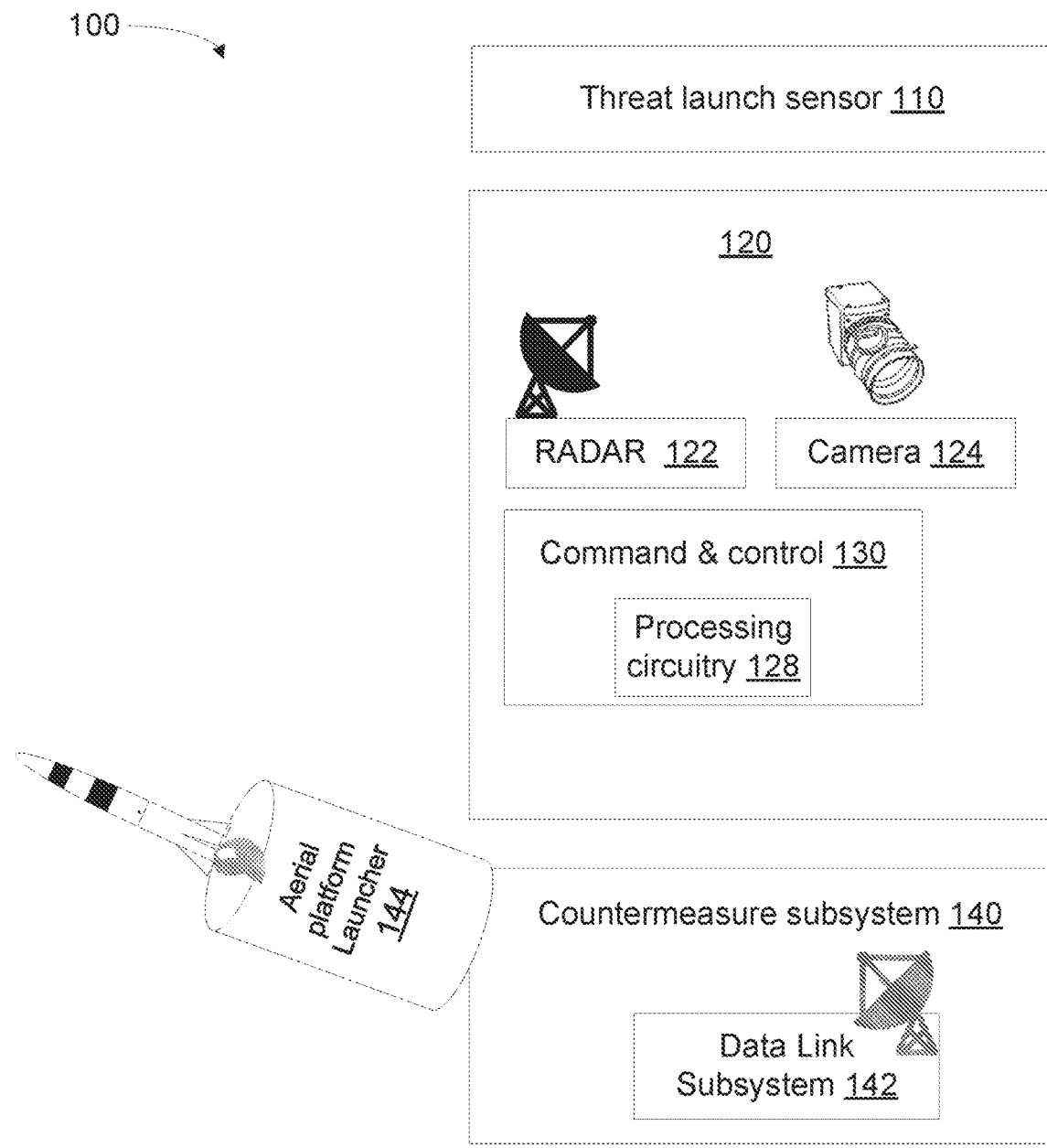
FIG. 2 is a schematic block diagram of components of an active protection system, according to some examples of the presently disclosed subject matter.
Figure 4:
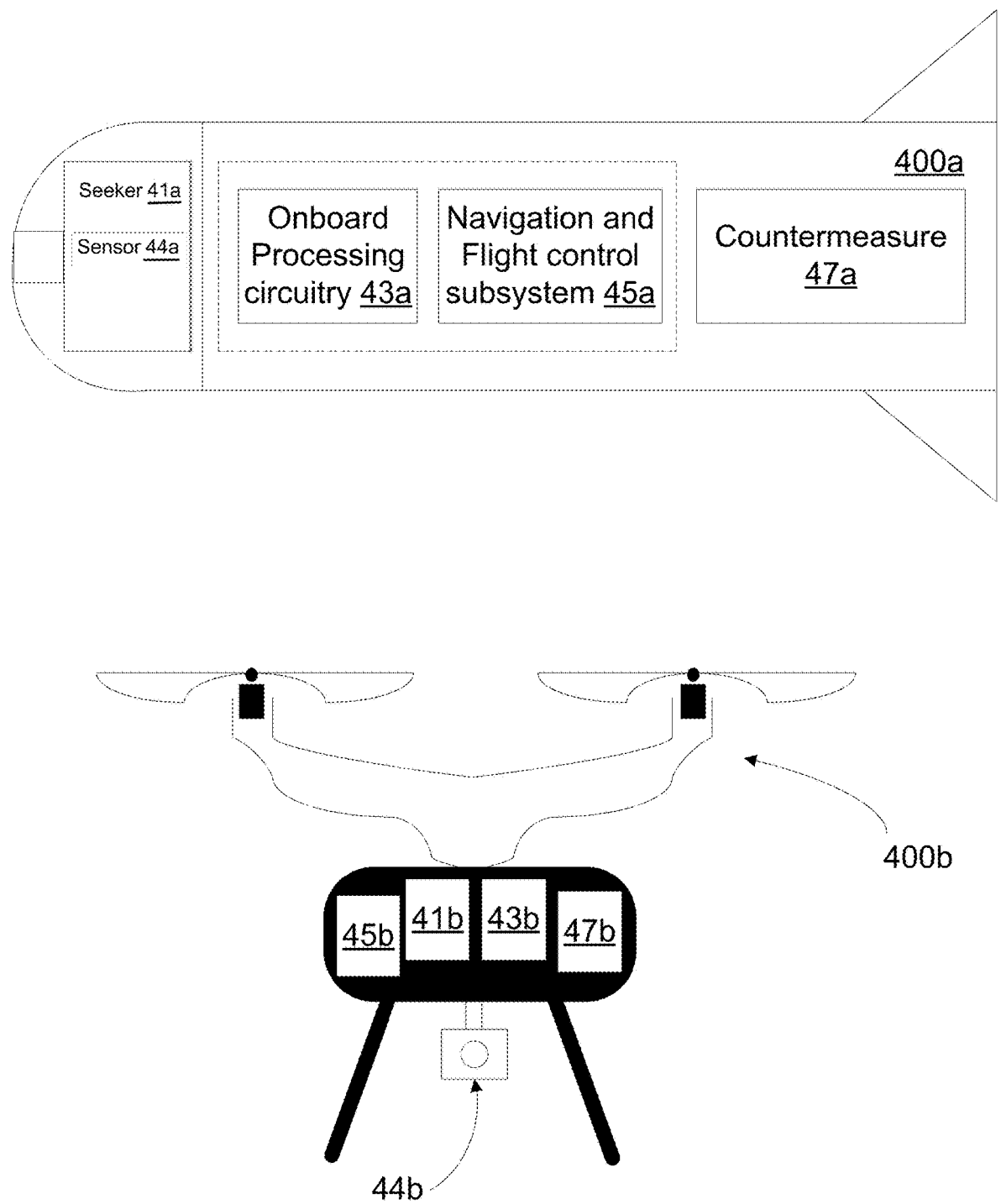
FIG. 4 is a schematic block diagram of an intercepting platform, according to some examples of the presently disclosed subject matter.

FIGS. 2 and 4 illustrate various aspects of the system architecture in accordance with some examples of the presently disclosed subject matter. Elements in FIGS. 2 and 4 can be made up of a combination of software and hardware and/or firmware that performs the functions as defined and explained herein. In some examples, functional elements in FIGS. 2 and 4 which are drawn as a single unit, may be divided, in practice, into several units, and functional elements in FIGS. 2 and 4 which are drawn as separate units, may be consolidated, in practice, into a single unit. For example, elements 43a and 45a, and correspondingly 43b and 45b, can be combined into a single sub-system. FIGS. 2 and 4 disclose various functional elements which are relevant to aspects of the presently disclosed subject matter. Clearly, in reality, the various systems and devices disclosed herein comprise many other components which are not described for simplicity and brevity of the description.

It is noted that while in the following description the term "missile" is used for describing a threat, this is done by way of example only and should not be construed as limiting, as the presently disclosed subject matter contemplates other types of beam riding munition. For example, an attacking drone which is directed towards a target using a guiding beam.

Bearing the above in mind, attention is now drawn to FIG. 1 showing a schematic illustration of a possible beam riding missile attack scenario. In the illustrated example, vehicle 10 is being targeted by a guided missile (e.g. ATGM). Once launched by the launcher 12, an aiming station is used for directing the missile to the target 10. The aiming station includes a designator 11 with a beam source, which is used for impinging a beam of electromagnetic radiation 13 for leading the missile 14 in a desired direction.

The missile 14 is equipped with a seeker installed on the missile body (e.g., on the missile aft) configured to track the beam and reach the designated target. In some examples, the beam source is a collimated light source configured to generate a beam of light such as a laser beam. The designator 11 can include for example a multi-wavelength beam combiner, which combines the output of several beam sources of different wavelengths into a single collimated beam. In some examples, the single collimated beam is generated such that one beam source output, having a first wavelength, is located at the center of the combined beam, and another beam source output, having a second wavelength, is located at the circumference of the combined beam, a configuration which allows the seeker to maintain a course within the center of the beam based on the wavelengths difference. A common practice is to point the beam above or aside from the target during the initial stages of flight. This helps to avoid accidently pointing to the ground and causing the missile to crash before reaching the target, and it also makes detection of the beam by the targeted asset more difficult.

As further explained below, the targeted vehicle 10 may comprise an active protection system 100. In other examples the protection system 100 may be installed on a different platform and provide defense services to a nearby area that includes targeted vehicle 10. Following detection of a threat-indication (e.g., missile threat-indication) system 100 determines the location (or estimated location) of the beam used for guiding of the missile and launches an aerial platform 16 (also referred to as an "effector"). The aerial platform is configured to sense the beam 13 and maintain a course along the beam ("ride the beam") in the opposite direction, towards the incoming missile, meet the missile along its course, and incapacitate the missile. As illustrated in FIG. 1, according to some examples, the aerial platform enters the beam and flies inside the volume of the beam.

It is noted that the example of a vehicle targeted by an ATGM described herein is only one non-limiting example of a possible scenario where active protection can be used. The same principles can be applied to any other asset, stationary or mobile, including but not limited to vehicle, structure, humans, etc., attacked by a beam riding missile or some other beam riding threat, such as a beam riding drone.

FIG. 2 is a block diagram schematically illustrating an active protection system 100, according to examples of the presently disclosed subject matter. System 100 comprises a beam detection and tracking subsystem 120, a missile launch sensor 110 and a countermeasure subsystem 140. Missile-launch sensor 110 is configured to detect various signatures which characterize a missile launch. Missile-launch sensors 110 are well known in the art and include sensors of various types, such as a variety of optical sensors. One example of a missile launch sensor is optical threat locator ELO-5220 OTHELLO manufactured by ELTA LTD. ELO-5220 OTHELLO is a compact and effective Hostile Fire Indicator (HFI) family of sensors, designed to detect gun fire, mortar fire, RPG and Anti-Tanks Guided Missiles (ATGM). Another example of a missile launch sensor is Missile Launch Detection Sensors (MILDS) manufactured by HENSOLDT. Beam detection and tracking subsystem 120, comprises radar 122, camera 124 and a computer processing circuitry 128 e.g., as part of a command-and-control unit 130.

Missile-launch sensor 110 is operatively connected to beam detection and tracking subsystem 120, which is configured in some examples, in response to indication of a suspected launch event received from sensor 110, to activate radar 122 and camera 124 for tracking the attacking missile and determining its flight path. In some examples the radar 122 can be activated for continuously scanning a suspected area to provide another means of detection of missile-threats, in addition to or instead of the detection provided by missile launch sensor 110.

Subsystem 120 is operatively connected to a countermeasure subsystem 140 configured to launch one or more aerial platforms. According to some examples, countermeasure subsystem 140 comprises an aerial platform launcher 144 and a datalink subsystem 142.

Turning now to FIG. 3, this shows a flowchart of operations carried out for interception of a threat for active protection of an asset according to some examples of the presently disclosed subject matter. At block 301 a threat-indication is received. According to one example a threat-indication can be a suspected missile launch event detected for example by missile launch sensor 110. According to another example, a threat-indication can be an indication of an approaching threat (e.g., approaching missile or drone). This type of missile-threat can be detected, for example, by detection and tracking subsystem 120 operated for scanning a certain area in search for an incoming missile. In some examples the two detection techniques (i.e., using sensor 110 and radar 122) can be applied simultaneously to increase certainty of detection. Threat-indication can also be received from some other source, such as another radar system operating in the area (e.g., onboard a nearby vehicle).

In case of a launch event indication determined by sensor 110, the sensor provides, to detection and tracking subsystem 120, data indicating the occurrence of the event as well as launch site localization data, such as line of sight, to the missile launching site, launch timing etc. The details and accuracy of the launch site localization data depend on parameters such as the range to the launch site and the specific sensor which is being used. For example, ELO-5220 OTHELLO, mentioned above, can indicate the azimuth and elevation direction of a detected hostile fire source, and provide launch site positioning data with an accuracy of a few milliradians, or better. Measured direction to fire source (launch site), together with a known topography map of the suspected area, provides a capability to localize coordinates of a launch site. Radar 122, illustrated as part of detection and tracking subsystem 120, receives the data obtained by sensor 110 and, in response, directs the radar antenna in the estimated direction of the incoming missile and detects and tracks the missile (block 303). Fusion of a radar track-data and data obtained by sensor 110 (including time of threat launch and line of sight to the launcher) can improve the localization of a launch site. Alternatively, as mentioned above in some examples, radar 122 is operated in scanning mode for scanning a suspected area and detecting an approaching missile. In case a missile is detected, radar 122 switches to tracking mode and tracks the incoming missile (block 303).

Further alternatively, in some examples, following detection of an approaching missile, radar 122 switches to common scanning/tracking mode (e.g., simultaneously scanning of a suspected area with a reduced scanning rate and tracking of the incoming missile).

One advantage of using sensor 110 rather than radar 122 for missile-threat detection is related to it being a silent technique, as it does not involve the transmission of detectable radar signals. In some examples, both sensors can be operated in a detection process, e.g., continuously operating sensor 110 for silent preliminary detection and operating radar 122 for verification and tracking of an incoming threat. According to some examples, if detection of a missile launch event is reported by missile launch sensor 110 but an incoming missile is not detected by the tracking system 120, a false alarm is determined, and the process is aborted. Otherwise, if detection of a missile launch event reported by missile launch sensor 110 is followed by detection of an approaching missile by the radar 122, the suspected launch event is validated, and the process proceeds to activation of the countermeasure subsystem 140. Double detection and validation of a launch event and/or approaching of incoming threat, by both sensor 110 and tracking subsystem 120 contribute to increasing the probability of missile-threat detection on one hand, and to decreasing false alarm rate on the other.

As mentioned above, tracking subsystem 120 can further comprise a camera 124 configured to track the missile in addition to the radar. Like the radar, in response to data indicative of a suspected launch event or data received from the radar 122 indicative of an incoming missile, the camera is pointed in the estimated direction of the missile, identifies, and tracks the incoming missile. The camera can be for example a Long Wave Infrared (LWIR) or Medium Wave Infrared (MWIR) camera. Using both radar 122 and camera 124 further contributes to verification of detection, by increasing probability of missile-threat detection and reducing false alarm rate.

In some examples radar 122 and camera 124 can track a threat, such as an incoming missile, using a close loop technique. According to this example, command-and-control subsystem 130 provides to the camera 124 a definition of a region of Interest (ROI) for detection of the threat, based on the radar track-data, which includes data indictive of the trajectory of the detected threat (herein below "threat track-data"; e.g., missile track-data). Command-and-control subsystem 130 also provides to the radar 122 more accurate angular location of the body (e.g., missile), based on the camera measurements, which facilitates accurate direction of the radar beam towards the body. In some examples camera 124 is configured to capture images of the incoming threat at a frame rate that exceeds radar measurements frequency (plot rate). In this case, fusion of the angular position and angular rate of the incoming threat measured by the camera with a range and radial velocity obtained by the radar, can provide data indicative of a lateral velocity of a body, orthogonal to the radial velocity determined solely by the radar. Thus, the combination of a radar and camera measurements provides more robust and accurate tracking, due to the superior capabilities of the camera for angular measurements. This synergic effect is beneficial for example in a typical depressed ATGM trajectory, where the accuracy of radar angular measurements is limited by multipath phenomena. Processing circuitry 128 (e.g., integrated in command-and-control unit 130) can be configured to combine radar and camera output into a unified threat track-data, which includes, for example, range, angular position, angular rate, radial and lateral velocities, as explained above.

The radar and camera continue to track the approaching threat along its flight path, while processing circuitry 128 is configured to estimate the location of the beam used for missile-guidance (e.g., ATGM) towards the designated target (block 305). The beam location can be estimated based on threat track-data collected during the flight of the threat e.g., by radar 122 and camera 124. In case the location of the launch site is also known (e.g., determined by sensor 110), the beam location can be estimated using this information together with the track-data. According to an example, the location points determined by radar 122 and/or camera 124 and optionally also sensor 110, can be used for calculating a line (a straight line or a substantially straight line) that sufficiently approximates the trajectory of the missile. Since the general shape of the guiding beam is known, given the above line, location of the beam in space can be estimated with sufficient accuracy for the purpose of directing an aerial platform towards the beam. In some examples, atmospheric models can be applied to improve the accuracy of the calculation, however, generally, calculating a line connecting two or more location points (e.g., a launch point location and missile location points during flight) provides sufficient accuracy. Continuous tracking of the missile by radar 122 and camera 124 enables to identify changes in the location of the beam during flight.

An aerial platform 16 is launched (e.g., by launcher 144 of a countermeasure subsystem 140 in response to a command issued by C&C 130; block 307) and is directed to fly in the direction of the beam. To this end the platform is provided with mission data, which includes the estimated beam location (referred to herein also as "beam location data"). Preliminary mission data produced by C&C subsystem 130 can be provided to the aerial platform, for example prior to launch by subsystem 144. The aerial platform can be any suitable aerial platform, including for example a missile or a drone, as explained below with reference to FIG. 4.

In some examples system 100 is configured to operate radar 122 and/or camera 124 for tracking the missile, also following launch of the aerial platform, to continuously monitor the position of the beam and provide, to the aerial platform during flight, updated information regarding the location of the beam (herein below "updated beam location data"). This information can include for example real-time location of the beam relative to the real-time location of the platform 16. To this end, sub-system 120 can be also configured to detect and track the aerial platform 16 while airborne and determine "platform track-data" including for example its position and velocity vector, as explained above with respect to threat track-data, and provide to the aerial platform more accurate location of the beam relative to the position and velocity vector of the aerial platform 16. According to some examples, datalink subsystem 142 is configured to communicate with the aerial platform during flight and transmit to the aerial platform, by uplink, the updated beam location data.

In some examples, the aerial platform 16 is configured to determine an entrance point to the beam using an onboard camera directed to an estimated beam source location (e.g., as received from C&C 130) and ride along the beam, for example, inside the beam volume, in a direction opposite to the advancement of the incoming missile, and use the beam to maintain course, leading directly to the missile. The aerial platform is configured to incapacitate the missile and prevent it from reaching and damaging the protected asset (block 309). Incapacitation of the missile can be achieved, for example, by hitting the missile directly and/or by activating some type of countermeasure unit (e.g., explosive charge) carried onboard the aerial platform 16.

In some examples, following activation of the countermeasure, assessment of success can be applied (block 311). To this end the radar 122 and camera 124 can be operated for determining whether the missile has been successfully destroyed, or whether it continues to fly in the direction of the target.

In some examples, the defense system disclosed herein provides "salvo" interception capabilities, in which more than one effector is launched in response to an identified missile-threat. Salvo interception helps to improve certainty of incapacitation of an incoming missile-threat, which may include several missiles and/or one or more decoys used for confusing defense systems and making it harder to incapacitate the threat. Thus, in some examples, more than one aerial platform is launched (e.g., two, three, or four, etc.). For instance, two aerial platforms can be launched following detection of an incoming missile. A first aerial platform ("leading aerial platform") can be directed to fly along the beam and incapacitate the incoming missile, and a second aerial platform ("trailing aerial platform") can be directed to fly behind the leading aerial platform. According to this example, information indicative of whether the leading aerial platform has successfully incapacitated the incoming missile can also be obtained by the trailing aerial platform, e.g., information obtained by its onboard camera or some other imaging/sensing payload and transmitted through datalink subsystem 142 to C&C 130. In another example, beam location data determined by the leading aerial platform (e.g., by the on-board camera installed on the leading aerial platform) can be made available to the trailing aerial platform (e.g., by updating the beam location data and transmitting the updated beam location data to the trailing aerial platform via data uplink 142). Notably, different aerial platforms can be launched simultaneously or sequentially.

In case the leading aerial platform fails to incapacitate the missile, or in case the missile-threat includes two or more missiles launched against the protected assets (salvo attack), the trailing aerial platform is directed towards the incoming missile and completes the mission (block 313). If, however, the missile is incapacitated by the leading aerial platform, and no additional missile is detected, the trailing aerial platform can be redirected towards the launch site and attack and destroy the firing unit (block 315).

In some examples the asset 10 may be attacked by two or more threats launched from different launching sites. In such a case several aerial platforms are launched (e.g., by a countermeasures system 140) and each of them is guided towards a different incoming missile.

In some examples, especially in cases where the aerial platform is a drone or some other unmanned aerial vehicle, if the incoming threat has been incapacitated, any trailing aerial platforms which may have been launched and not used, can return to system 100 (e.g., to countermeasure subsystem 140) to be used in further missions.

In some examples, the asset 10 may be attacked by two or more threats (salvo attack) where the threats are guided using the same guiding beam. In such cases, protection system 100 can launch a single aerial platform against each incoming threat, while data exchange can be managed as follows: accurate beam location data can be transmitted from the first (leading) aerial platform (directed for targeting a first threat) to protection system 100 (e.g. to C&C 130), and from there transmitted to a second (trailing) aerial platform (directed for targeting a second threat), thus providing more accurate beam location data to the second aerial platform. In addition, the second aerial platform can provide to the protection system information regarding assessment of success of incapacitating of the first threat by the first aerial platform, as mentioned above.

As further explained with reference to FIG. 6, in some examples, the aerial platform 16 can be used for providing to system 100 data on one or more lines of sight (LOS) to the aiming station identified by the light source of the designating beam, each LOS determined from various in-flight positions of the aerial platform along the beam, where the LOS are used for determining a position of the firing unit and enabling to counterattack the unit.

FIG. 4 is a block diagram schematically illustrating an aerial platform (16 in FIG. 1; 400 in FIG. 4) according to examples of the presently disclosed subject matter, where 400a schematically illustrates an example of a missile aerial platform and 400b schematically illustrates an example of a drone aerial platform. Aerial platform 400 comprises a seeker 41a/b fixed to the aerial platform's body, an autonomous navigation and flight control subsystem 45a/b, Up/Down Link subsystem (not shown) for communicating (as mentioned above) to the C&C 130 via the ground Data Link subsystem 142 and countermeasure unit 47a/b.

Seeker 41a/b comprises a sensor (44a/b) configured to detect electromagnetic radiation in the wavelength range of the guiding beam, thus enabling detection of the beam, converging its flight path with the beam, and maintaining course within the beam. According to some examples, an optical sensor (camera) is used. According to other examples, where the guiding beam is in the radiofrequency range, the sensor is an onboard receiver. According to other examples, both types of sensors are installed onboard the aerial platform and the appropriate sensor is activated according to the type of guiding beam which is detected.

The seeker further comprises or is otherwise operatively connected to an onboard processing circuitry 43a/b configured, inter alia, to apply a process adapted for maintaining the flight path of the aerial platform aligned with the light beam. In some examples processing circuitry 43a/b can be integrated as part of the navigation and flight control subsystem 45a/b.

FIG. 5 is a flowchart of operations carried out by the aerial platform, according to examples of the presently disclosed subject matter. As mentioned above, the aerial platform is launched towards the guiding beam and directed towards the beam, based on beam location data received from the tracking subsystem 120. The aerial platform locates the beam and flies along the beam in a direction opposite to advancement of the incoming threat (block 501), e.g., the platform enters the beam and flies inside its volume.

The onboard sensor is used for maintaining the flight path of the aerial platform aligned with the direction of the beam. According to some examples, where the guiding beam is a light beam (e.g., a laser beam in the visible light or infrared light range), the sensor onboard the aerial platform is a camera configured to capture a stream of images (block 503), where images captured by the camera are processed (e.g., by processing circuitry 43a/b) and the data extracted from the images (e.g., generated by or resulting from the light source) is used for generating flight instructions for controlling onboard flight control devices (e.g., wings and thrust) and guiding the aerial platform along the beam toward the beam source (block 505).

In some examples, the aerial platform includes a wide-angle onboard camera assembled to the aerial platform in a fixed position (fixed orientation with respect to the platform's body), thereby maintaining aerial platform flight vector aligned with the beam using camera imaging. In other examples, where the onboard camera is connected to the platform using a gimbal mechanism, or where a mirror mechanism fixed to the aerial platform is used, during the initial stages of flight, the gimbals or mirrors can be used for adapting the line of sight of the camera FOV pointing in the direction to the beam source, in addition to or instead of maneuvering the platform. At a later stage, as the range between the aerial platform and the incoming missile is closing, the gimbals or mirrors are locked in position to maintain a fixed camera LOS relative to the platform's body. When using gimbals, commands to the gimbals can be used by navigation and flight control subsystem 45a/b to generate flight maneuvering instructions that maintain the gimbals away from their mechanical limitations.

An example of image processing applied by the onboard processing circuitry 43a/b on images captured by camera 44a/b onboard the aerial platform is now described with reference to blocks 505a and 505b. The camera onboard the aerial platform is directed towards the beam source such that images captured by the camera contain a main spot generated by the beam source. The images are processed, and the main spot is identified in the images. The location of the spot relative to the focal plane array of the camera is monitored, and data, e.g., in the form of flight maneuvering instructions, is generated by the processing circuitry (block 505a). Responsive to the generated data, the aerial platform is maneuvered such that the spot is maintained within the focal plane array of the camera, thereby aligning the flight path of the aerial platform with the direction of the beam. In some examples, the flight path of the platform converges with the beam, i.e., the platform enters the beam and flies within it volume. In other examples, the platform may fly with some offset to the beam, e.g., along the external surface of the beam. As mentioned above, maneuvering instructions can be executed for example by navigation and flight control subsystem 45a/b. Notably, aligning the flight path of the aerial platform 400 with the direction of the beam as described herein above is meant to include examples of substantially aligning the aerial platform with the direction of the beam, i.e., with some acceptable deviation from the beam.

In some examples in additional to the main spot, secondary spots in the image are also identified. The secondary spots are generated due to light scattering of the beam by the airframe (body) of the missile (aka "halo effect"), where, in general, the secondary spots are smaller than the main spot. According to this example, location of the secondary spots in the captured images, relative to location of the main spot, is monitored, and data, e.g., in the form of maneuvering instructions, is generated by the processing, causing the aerial platform to maneuver in a manner that the main spot in the captured images is located at the center of the images (including possibly substantially at the center), and the secondary spots surround the main spot.

Responsive to the generated data, navigation and flight control subsystem 45a/b controls the aerial platform (e.g., provides control commands to flight control devices such as wings and/or thrust vector control), such that the spot is maintained within the focal plane array of the camera (in some examples while the main spot is surrounded by the secondary spots, e.g., the main spot being located substantially at the center of the secondary spots), thereby aligning the flight path of the aerial platform with the direction of the beam.

Notably, in some examples only one or more secondary spots may be identified in the image and not the main spot. In such a case the aerial platform maintains a secondary spot or center of gravity of plurality of secondary spots in the center of the images (e.g., by processing circuitry 43a/b and flight control subsystem 45a/b). This enables the platform to complete the incapacitation of the incoming threat in case only secondary spots are identified.

Block 505b pertains to an additional processing approach which can be optionally applied in case the beam source, the incoming missile and the camera 44a/b are aligned, the captured images show the main spot of the light source hidden by a shaded area (herein below "airframe-shadow" or "body-shadow") resulting from the missile body blocking the light beam, where the secondary spots surround the shaded area. In some examples, the captured images are processed, and an airframe-shadow is identified in the images. Based on the processed images, data, e.g., in the form of maneuvering instructions, is generated by the processing circuitry for causing the aerial platform to maneuver, such that the main spot is maintained covered in the images by the missile-body, thus showing the airframe-shadow in the images. This enables to maintain the flight path of the aerial platform aligned with the flight path of the incoming missile.

In the specific example of an ATGM having a typical diameter ($\approx 0.15$ m) and a beam source wavelength ($\approx 1$ μm), an airframe-shadow produced by an ATGM would be effective along the ATGM trajectory, where a diffraction limit of about 15 micro-radians (μrad) enables to sense an airframe-shadow for above 9000 m, which is a distance compatible with common ATGM flight ranges.

According to some examples, the processing circuitry (128) is configured to generate two types of maneuvering instructions for controlling the flight of the aerial platform, coarse maneuvering instructions, and fine maneuvering instructions. Coarse maneuvering instructions are generated to obtain images which show the main spot being surrounded by the secondary spots (block 505a). These instructions align the velocity vector of the aerial platform with the beam. Fine maneuvering instructions are generated to obtain images which show the airframe-shadow, i.e., the main light spot being hidden by the missile body (505b). These instructions align the velocity vector of the aerial platform and camera line of sight with the incoming missile. In some examples, coarse maneuvering instructions are generated at the initial stages of interception. As the range between the aerial platform and incoming missile is closing, airframe-shadow becomes visible and fine maneuvering instructions are generated.

Images captured by the camera are continuously processed to determine the location of the main spot and secondary spots. In case it is determined that the main spot is not at the center surrounded by the secondary spots, flight maneuvering instructions (and in some cases gimbal commands) are generated for maneuvering the aerial platform until the captured images show the desired pattern. Likewise, images captured by the camera are continuously processed to determine whether an airframe-shadow is at the center of the camera FPA. In case it is determined that the airframe-shadow deviates from the FPA center, flight maneuvering instructions (and in some cases gimbal commands) are generated for maneuvering the aerial platform, until the airframe-shadow appears in the images close to the center of camera FPA.

It is noted, that if the airframe-shadow is not detected, incapacitation of the incoming missile can be completed based on coarse maneuvering alone. On the other hand, in case airframe-shadow is identified right from the start, coarse maneuvering is unnecessary, and incapacitation of the incoming missile can be completed, based on fine maneuvering alone. Thus, in some examples only the main spot is used during image processing, in other cases the main spot and secondary spots are used, in some cases airframe-shadow is used, in addition to or instead of the main spot, and in some cases only secondary spots are used.

The processing continues until one or more countermeasure activation conditions are satisfied. According to one example, the aerial platform is configured to intercept the missile by directly hitting/colliding with the missile (the countermeasure activation condition being for example direct impact). According to another example, the aerial platform is configured to activate a countermeasure unit (e.g., comprising an explosive charge) upon detection that the range between the aerial platform and missile is lower than a certain threshold (also referred to herein as "countermeasure activation range"). To this end, the aerial platform can comprise for example a proximity fuse connected to a countermeasure configured to activate the countermeasure in response to detection that the range between the aerial platform and missile is within the countermeasure activation range. The countermeasure can be for example an explosive charge, or a fragmentation warhead configured to explode when the aerial platform is near the missile.

According to some examples, the method of incapacitation of the missile is determined in real-time, where in case the airframe-shadow appears at the center of the FPA— hiding the main spot and indicating alignment with the incoming missile, incapacitation of the missile is done by a direct hit, and where, in other cases, a countermeasure unit is activated, e.g., by a proximity fuse.

In some examples the closing velocity and a distance between the aerial platform and the incoming missile can be determined by system 120, where the timing of the countermeasure activation is determined by system 120 (e.g., by command-and-control 130) and transmitted to the aerial platform via uplink message (e.g., by datalink subsystem 142).

In some examples, the proximity fuse is operatively connected to a processing circuitry (e.g., circuitry 43a/b) which is configured to apply image processing on the captured images and determine the distance between the incoming missile and aerial platform based on the size of the main spot or airframe-shadow (which increases as the distance is closing) and one or more, known or estimated, missile dimensions (e.g., circumference of the missile). In some examples the closing velocity and the distance between the aerial platform and incoming missile can be determined by processing of images captured by the onboard camera and calculating the rate of increase in size of the main spot or airframe-shadow.

The processing circuitry 43a/b can be therefore configured to continuously process the captured images and determine the distance from the incoming missile and possibly also the closing velocity and generate instructions for activating the countermeasure in case the area of the main spot or airframe-shadow is greater than a certain value. To this end, in some examples a lookup table correlating between the area of the main spot or airframe-shadow, and the distance between the missile and the camera, is provided (e.g., stored in a computer storage device onboard the aerial platform) and used for determining the distance between the missile and aerial platform.

In other examples, where the guiding beam is in the radio frequency range, the onboard sensor is a receiver which can be used for identifying the center of the beam or main lobe, e.g., based on the intensity of the received signal. According to this example, the location of the main lobe relative to the field of view of the receiver is monitored, and data, e.g., in the form of maneuvering instructions, is generated by the processing circuitry. Responsive to the generated data, the aerial platform is maneuvered such that the main lobe is maintained within the field of view of the receiver, preferably at the center of the field of view, thereby aligning the flight path of the aerial platform with the direction of the beam (including possibly substantially aligning the flight path with the direction of the beam). As mentioned above, maneuvering instructions can be executed for example by navigation and control subsystem 45a/b. Notably, since using the airframe-shadow is not applicable in this case, incapacitation of the incoming threat is generally executed by means other than a direct hit.

Figure 6:
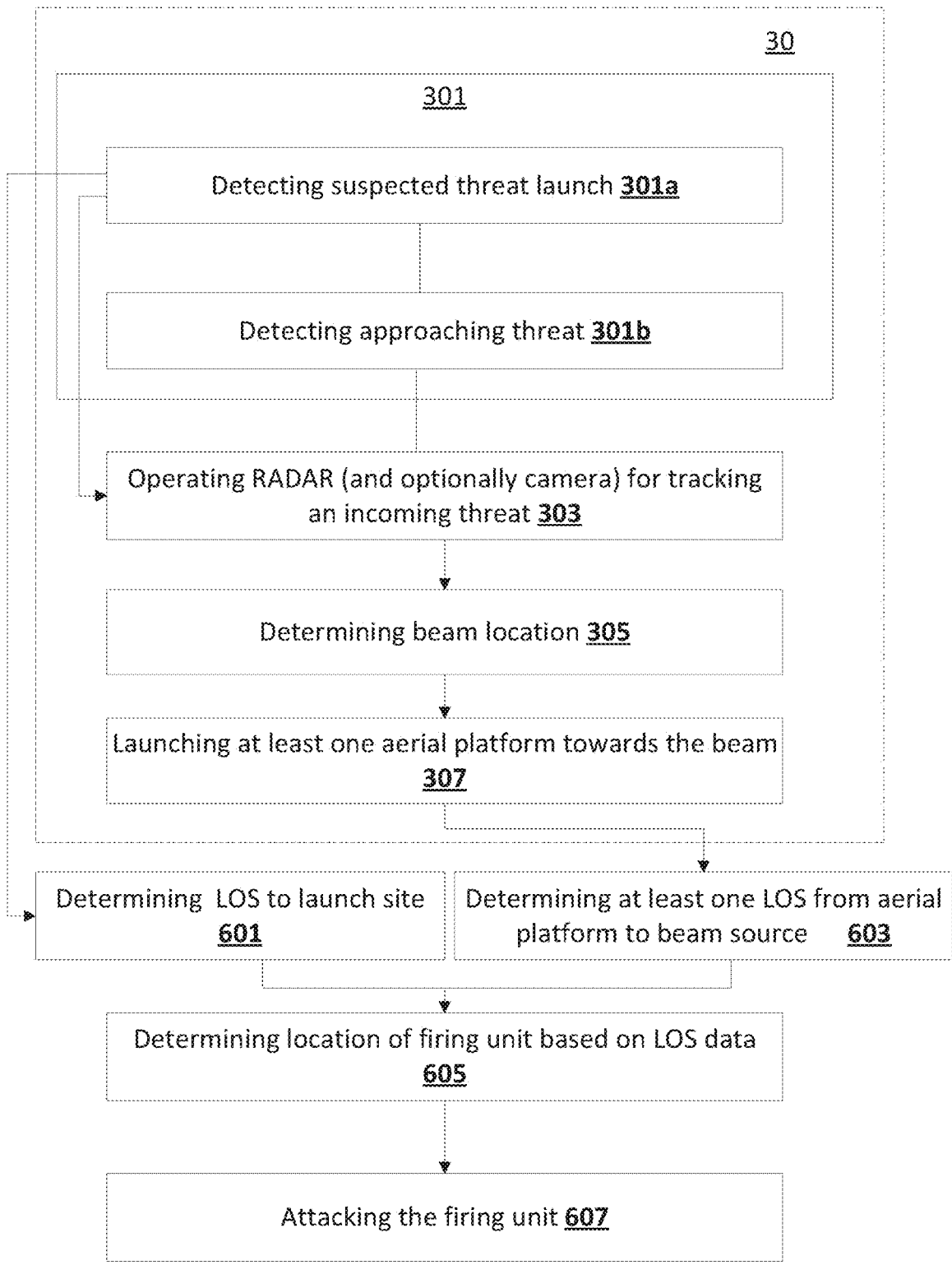
FIG. 6 is a flowchart of operations carried out for localizing a firing unit, according to some examples of the presently disclosed subject matter.

Turning to FIG. 6, this illustrates a flowchart of operations carried out according to some examples of the presently disclosed subject matter. Operations described with reference to FIG. 6 are related to a method of locating a firing unit of a missile-threat, e.g., AGTM firing unit. It is noted that operations described with reference to block 30 in FIG. 3 are also part of the process described with reference to FIG. 5, and accordingly are not described in detail. The additional operations which are described with reference to blocks 601 to 607, can be executed in addition to or instead of the operations described with reference to blocks 309 to 315 in FIG. 3.

To determine the location of the firing unit, lines of sight (herein below "LOS data") to the firing unit are determined. In case sensor 110 is available and operative, a first LOS can be determined to the launch site based on data as obtained by sensor 110 (e.g., elevation and azimuth; block 601). Once the aerial platform is airborne and has identified the beam source (e.g., beam source light spot identified by the onboard sensor (44a/b) or some other onboard sensor), one or more additional lines of sight are determined from the known position of the aerial platform to the beam source as captured by the sensor. As explained above, the location of the beam can be identified by threat track-data obtained by the radar 122 and camera 124. After the aerial platform converges with the beam (e.g., enters the beam volume and flies within the beam) it can identify the beam source using its onboard payload (e.g., onboard sensor 44a/b) and determine a line of sight to the beam source (e.g., with the help of processing circuitry 43a/b). Notably, as designation of the missile is done by line-of-sight designation, the designating beam has a substantially straight line extending between the aiming station and the targeted asset. As the aerial platform continues to fly along the beam, additional lines of sight to the beam source can be determined, each from a different position of the aerial platform, thereby enabling to verify and improve the accuracy of the launch site localization. LOS data is transmitted by downlink from the aerial platform to subsystem 120, where multiple lines of sight can be processed (e.g., by processing circuitry 128) to determine the position of the firing unit (block 605).

Notably, while sensor 110 provides information on the launch site location, in some cases the missile may be launched by a divided firing unit, where the launch is made from a launcher located at a first location and the guiding of the missile is done from an aiming station located at a second location. In case launch site and beam designation are performed from the same site (i.e., a unified firing unit) LOS determined to launch site, based on sensor 110, can be integrated with one or more lines of sight determined by the aerial platform, to thereby increase accuracy of calculation of launch site/beam source location. In case a divided firing unit is used, two different locations are determined, one based on data from sensor 110, and the other based on lines of sight determined and received by downlink from the aerial platform. Determining whether the firing unit is divided or not can be based on various data, including, for example, the minimal distance between LOS determined to the launching site, based on data received from sensor 110, and LOS determined to light source from the aerial platform. If this distance is less than LOS measurement error, a single (undivided) firing unit can be assumed.

Once the location of the firing unit is determined, the firing unit can be attacked (block 607). In case the firing unit is divided, and the aiming station and the launch site are located at different locations, an attack can be launched on either one or both points. The attack can be launched by various techniques and agents. According to one example, as mentioned above, the attack can be issued by one or more aerial platforms launched by countermeasure subsystem 140. In case of a divided firing unit, at least one aerial platform can be directed to attack the launch site and at least one other aerial platform can be directed to attack the aiming stations. According to another example, the location(s) of the firing unit can be provided to a different force which may be responsible for executing a counterattack. For example, command-and-control unit 130 can transmit data indicative of the location of the aiming station to a fighter aircraft or to an artillery battery, which execute the attack(s).

Figure 7:
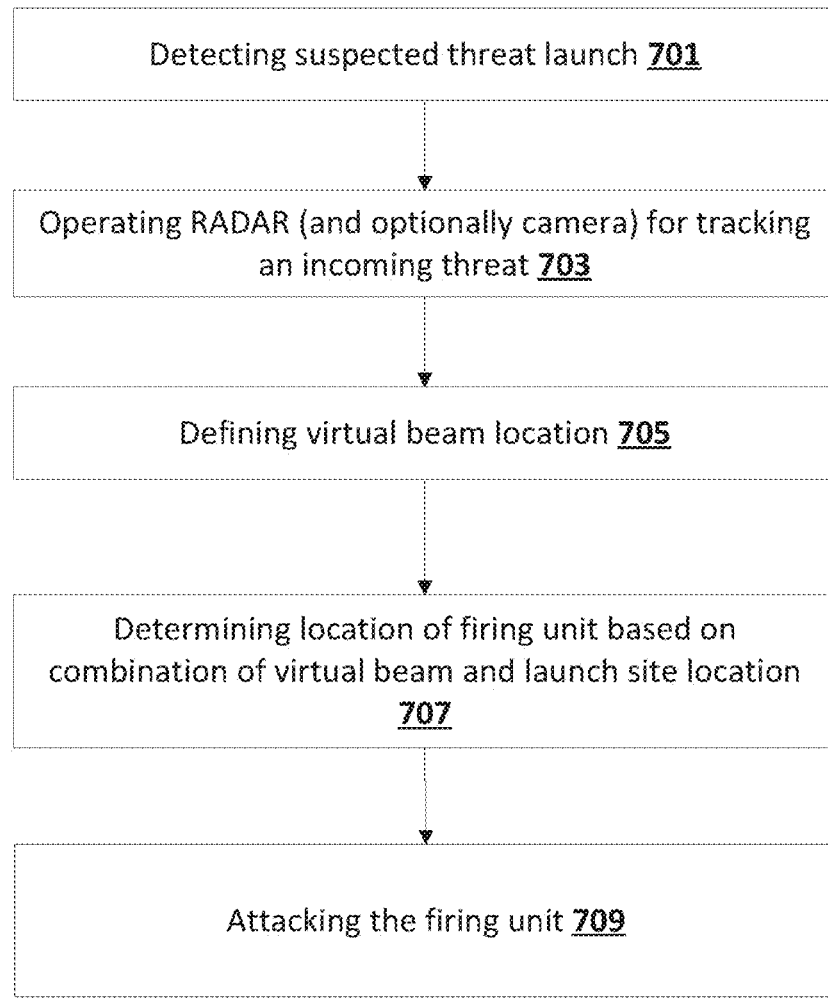
FIG. 7 is a flowchart of operations carried out for localizing a firing unit using a virtual beam, according to some examples of the presently disclosed subject matter.

FIG. 7 is a flowchart of operations carried out according to some examples of the presently disclosed subject matter. FIG. 7 is related to a method of localizing a firing unit, where a designating beam is not available. This may be the case, for example, where a designating beam is not used for guiding the missile following launch. According to the presently disclosed subject matter, a virtual beam is defined based on the threat track-data and used for determining a location of the firing unit. As explained above, an aerial platform is launched in the direction of an incoming missile and searches for the designating beam. However, if the aerial platform is unable to detect a beam, operations can be executed according to the principles disclosed with reference to FIG. 7. Likewise, this process can be used in case system 100 is unable to launch an aerial platform, e.g., the launching subsystem 144 malfunctions, or all available aerial platforms have already been launched.

A missile-threat is detected by sensor 110 (block 701) thus providing a first line-of-sight to the launching site as detected by the sensor. Following detection of a missile-threat, the radar 122 and camera 124 are operated for tracking the missile flight path and collecting threat track-data (block 703). The threat track-data includes location points of the missile detected by the radar 122 and camera 124. In case a guiding beam is not available, a virtual beam is generated based on the threat track-data, as detected by radar and the camera (block 705).

As mentioned above, the flight path of line-of-sight missiles such as ATGMs is characterized by a substantially straight line, and thus, by tracking the flight of the threat and obtaining the respective threat track-data, which includes missile location points along its flight path, a virtual guiding beam or "a virtual flight corridor" in which the missile is expected to advance, can be extrapolated from the detected location points of the missile provided with the threat track-data. Therefore, according to this example, the actual missile flight path is used to identify the location of the launch site.

In some cases, protection system 100 may be installed in one platform while an incoming threat missile attacks a nearby asset. In such scenarios sensor 110 may not have a clear LOS to the threat launch site (e.g., due to topographic features) and the location of firing unit 11 is determined by using the virtual beam location alone (block 709).

In other scenarios a more accurate location of the launch site is determined based on both the LOS obtained from sensor 110 and the virtual beam (block 709). As explained above with reference to FIG. 6, once the location of the firing unit is determined (divided or unified), the firing unit can be attacked. In case the aiming station and the launch site are located at different points, an attack can be launched on either one or both points. According to one example, as mentioned above, the attack can be issued by one or more aerial platforms launched by countermeasure subsystem 140. In case of a divided firing unit, at least one aerial platform can be directed to attack the launch site and at least one other aerial platform can be directed to attack the aiming stations. According to another example, the location(s) of the firing unit can be provided to a different force which may be responsible for executing a counterattack.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A system for intercepting a beam-riding threat, comprising:
   a tracking subsystem, a computer processing circuitry and a countermeasure subsystem;
   the tracking subsystem is configured, following receipt of a threat-indication, to track an incoming threat and provide threat track-data to the computer processing circuitry;
   the processing circuitry is configured to determine, based on the threat track-data, an estimated location of a guiding beam used for guiding the incoming threat;
   the system is configured to:
   generate instructions causing the countermeasure subsystem to launch at least one aerial platform, the aerial platform comprises an onboard sensor sensitive for detecting electromagnetic radiation of the guiding beam; and provide to the aerial platform the estimated location of the guiding beam, to thereby enable the aerial platform to locate the guiding beam and operate the onboard sensor for flying along the guiding beam towards the incoming threat.

2. The system of claim 1, wherein the onboard sensor is operatively connected to an onboard processing circuitry, the aerial platform comprising a flight control subsystem;
the onboard processing circuitry is configured to:
process images captured by the onboard sensor, and identify in the images a spot created by a beam source of the guiding beam;
monitor the location of the spot relative to onboard sensor focal plane array; provide data to the flight control subsystem for causing the flight control subsystem to maneuver the aerial platform such that the spot is maintained within the focal plane array of the onboard sensor and thereby align a flight path of the aerial platform with the direction of the beam.

3. The system of claim 2, wherein the aerial platform comprises a countermeasure configured to be activated for incapacitating the threat upon compliance with a countermeasure activation condition; and wherein the countermeasure is operatively connected to a proximity fuse configured to process images captured by the onboard sensor and determine the range and/or closing velocity of the threat based on changes detected in the images.

4. The system of claim 1, wherein the aerial platform is configured to enter the beam and fly inside the beam.

5. The system of claim 1, wherein the tracking subsystem comprises a radar configured to track the aerial platform and collect platform track-data and a camera configured to track flying objects together with the radar to thereby improve accuracy of the threat and/or aerial platform track-data obtained by the radar.

6. The system of claim 5, wherein the camera is configured to capture images at a frame rate that exceeds rate of radar plot measurements to thereby obtain accurate lateral velocity of the tracked object which is orthogonal to radial velocity determined by the radar alone.

7. The system of claim 1 further comprises or otherwise operatively connected to a launch detection sensor configured to detect a launch event and determine an estimated location of a launch site;
wherein the tracking subsystem is configured, following launch of aerial platform, to continue and track the incoming threat and collect threat track-data; and
the processing circuitry is configured to determine and transmit to the aerial platform, updated location of the launch site, determined based on the threat track-data and estimated location of the launch site provided by the launch detection sensor.

8. The system of claim 1, wherein the aerial platform is configured to transmit to the processing circuitry, during flight along the beam, line of sight (LOS) data indicative of one or more lines of sight from the aerial platform to a beam source of the guiding beam; wherein the processing circuitry is configured to estimate location of a firing unit, based on the LOS data.

9. The system of claim 8 further comprising or otherwise operatively connected to a launch detection sensor configured to detect a threat launch event and determine an estimated location of a launch site, wherein the threat-indication is provided by the launch detection sensor following detection of the threat launch event; wherein the processing circuitry is configured to improve an accuracy of a firing unit localization based on the LOS data received from the aerial platform and the estimated location of the launch site received from the launch detection sensor.

10. The system of claim 1, wherein the aerial platform is any one of a missile; unmanned aerial vehicle (UAV); and drone.

11. The system of claim 1, wherein the aerial platform comprises a countermeasure configured to be activated for incapacitating the threat upon compliance with a countermeasure activation condition.

12. The system of claim 1, wherein the countermeasure subsystem is configured to launch at least two aerial platforms the at least two aerial platforms include a leading aerial platform and at least one trailing aerial platform, and wherein, in case the leading aerial platform fails to incapacitate the incoming threat, the at least one trailing platform is directed towards the beam and flies along the guiding beam towards the incoming threat.

13. The system of claim 12 is configured for assessing successful incapacitation of the incoming threat by the leading aerial platform based on data obtained by the at least one trailing aerial platform.

14. The system of claim 1, wherein the onboard sensor is an onboard receiver configured to detect a radio frequency guiding beam and wherein an onboard processing circuitry is configured to:
process signals captured by the onboard receiver and provide data to a flight control subsystem for causing the flight control subsystem to maneuver the aerial platform such that a flight path of the aerial platform is aligned with the direction of the beam.

15. A method of intercepting a beam riding threat, the method comprising:
following receipt of a threat-indication, tracking an incoming threat and determining threat track-data;
determining, based on the threat track-data, an estimated location of a guiding beam used for guiding the threat;
launching at least one aerial platform towards the guiding beam, the aerial platform comprising an onboard sensor sensitive for detecting electromagnetic radiation of the guiding beam; and providing to the aerial platform the estimated location of the guiding beam, to thereby enable the aerial platform to locate the guiding beam and fly along the guiding beam towards the incoming threat.

16. The method of claim 15 further comprising:
capturing images using the onboard sensor;
utilizing an onboard processing circuitry for:
processing the images captured by the onboard sensor, and identifying in the images a spot created by a beam source of the guiding beam;
monitoring a location of the spot relative to a focal plane array of the onboard sensor, and providing data to a flight control subsystem for causing the flight control subsystem to maneuver the aerial platform such that the spot is maintained within the focal plane array of the onboard sensor, thereby aligning a flight path of the aerial platform with the direction of the beam.

17. The method of claim 16, wherein the spot is a main spot created by a beam source of the guiding beam, the method further comprising:
processing the images and identifying, in addition to the main spot, secondary spots created by scattering of the guiding beam from a body of the threat;
monitoring the location of the secondary spots relative to the main spot; and providing to the flight control subsystem data, enabling the flight control subsystem to maneuver the aerial platform while striving to maintain the main spot at the center of the images surrounded by the secondary spots, thereby maintaining the flight path of the aerial platform aligned with the guiding beam.

18. The method of claim 16 further comprising:
processing the images and identifying an airframe-shadow resulting from the body of the threat blocking the guiding beam; providing data to the flight control subsystem for enabling the flight control subsystem to maneuver the aerial platform such that the images show the airframe-shadow, thereby maintaining the flight path of the aerial platform aligned with the flight path of the incoming threat.

19. The method of claim 15, wherein the threat-indication is indicative of an estimated location of a launch site and is received from a launch detection sensor configured to detect a threat launch event; the method further comprising:
receiving from the aerial platform, during flight along the guiding beam, line of sight (LOS) data indicative of one or more lines of sight from the aerial platform to a beam source of the guiding beam;
improving accuracy of firing unit localization based on the LOS data received from the aerial platform and the estimated location of the launch site.

20. The method of claim 15 further comprising activating a countermeasure onboard the aerial platform for incapacitating the threat, upon compliance with a countermeasure activation condition.

21. The method of claim 20, wherein the countermeasure activation condition is a range between the aerial platform and the threat, and which is smaller than a certain value.

22. The method of claim 15 further comprising:
utilizing an onboard processing circuitry for processing images captured by the onboard sensor and determining the range and/or closing velocity of the threat based on changes in the images; and
activating a countermeasure onboard the aerial platform for incapacitating the threat, upon compliance with a countermeasure activation condition, wherein the countermeasure activation condition is a range between the aerial platform and the threat, and which is smaller than a certain value.

23. The method of claim 15 further comprising:
launching at least two aerial platforms;
directing at least one aerial platform towards the guiding beam for incapacitating the threat and at least one other aerial platform for targeting a launch site/firing unit.

24. The method of claim 15 further comprising:
launching at least two aerial platforms; wherein the at least two aerial platforms include a leading aerial platform and at least one trailing aerial platform, the method further comprising: directing the leading aerial platform towards the guiding beam and flying along the guiding beam for incapacitating the incoming threat; and in case the leading aerial platform fails to incapacitate the incoming threat, directing the at least one trailing platform towards the beam to target the incoming threat.

25. A non-transitory computer readable storage medium tangibly embodying a program of instructions that, when executed by a computer, cause the computer to perform a method of intercepting a beam-riding threat, the method comprising:
following receipt of a threat-indication, tracking an incoming threat and determining threat track-data;
determining, based on the threat track-data, an estimated location of a guiding beam used for guiding the threat; launching at least one aerial platform towards the guiding beam, the aerial platform comprising an onboard sensor sensitive for detecting electromagnetic radiation of the guiding beam; and providing to the aerial platform the estimated location of the guiding beam, to thereby enable the aerial platform to locate the guiding beam and fly along the guiding beam towards the incoming threat.

26. An aerial platform configured to incapacitate a beam riding threat; the platform comprising a flight control subsystem and an onboard sensor operatively connected to an onboard processing circuitry;
the aerial platform is configured to:
receive data indicative of estimated location of a guiding beam used for guiding an incoming threat, to be launched and to fly towards the guiding beam, locate the guiding beam and to fly along the guiding beam towards the incoming threat;
wherein the onboard sensor is sensitive for detecting electromagnetic radiation of the guiding beam;
the onboard processing circuitry is configured to:
process data sensed by the sensor and generate instructions causing the aerial platform to fly along the guiding beam.

27. The aerial platform of claim 26, wherein the data includes images captured by the onboard sensor; the processing circuitry is configured to:
process the images captured by the sensor, and identify in the images a spot created by a beam source of the guiding beam;
monitor the location of the spot relative to a focal plane array of the sensor; and provide data to the flight control subsystem for causing the flight control subsystem to maneuver the aerial platform such that the spot is maintained within the focal plane array of the onboard sensor and thereby align a flight path of the aerial platform with the direction of the beam.

28. The aerial platform of claim 27, wherein the spot is a main spot produced by direct illumination of the beam source, and the onboard processing circuitry is further configured to:
process the images and identify, in addition to the main spot, secondary spots created by scattering of the beam from a body of the threat;
monitor the location of the secondary spots relative to the main spot; and provide to the flight control subsystem data, enabling the flight control subsystem to maneuver the aerial platform such that the images show the main spot at the center surrounded by the secondary spots, thereby maintaining the flight path of the aerial platform aligned with the beam.

29. The aerial platform of claim 27, wherein the onboard processing circuitry is further configured to:
process the images and identify an airframe-shadow resulting from a body of the threat blocking the guiding beam; provide data to the flight control subsystem for enabling the flight control subsystem to maneuver the aerial platform such that the images show the main spot covered by the airframe-shadow, thereby maintaining the flight path of the aerial platform aligned with the flight path of the incoming threat.

30. The aerial platform of claim 27 is any one of a missile; drone; and unmanned aerial vehicle (UAV).

31. A system of locating a firing unit of an incoming beam guided threat, the system comprising:

a tracking subsystem operatively connected to a computer processing circuitry;

the tracking subsystem is configured, following receipt of a threat-indication, to track an incoming threat and determine threat track-data;

the processing circuitry is configured to determine, based on the threat track-data, an estimated location of a guiding beam;

the system is configured to:

generate instructions causing launch of at least one aerial platform towards the guiding beam, and provide, to the aerial platform, the estimated location of the guiding beam, to thereby enable the aerial platform to locate the guiding beam and fly along the guiding beam towards the incoming threat;

wherein the aerial platform comprises an onboard camera operatively connected to an onboard processing circuitry;

the onboard processing circuitry is configured to:

process images captured by the onboard camera, and identify, in the images, data indicative of a beam source of the guiding beam;

determine line of sight (LOS) data indicative of one or more lines of sight extending from the aerial platform to the beam source;

wherein the processing circuitry is configured to determine a location of a firing unit, based on the LOS data.

32. The system of claim 31, further comprising or otherwise operatively connected to a launch detection sensor configured to detect a threat launch event and determine an estimated location of a launch site, wherein the processing circuitry is configured to improve accuracy of a firing unit localization based on the LOS data received from the aerial platform and the estimated location of the launch site received from the launch detection sensor.

* * * * *